No. 762,720. PATENTED JUNE 14, 1904.
C. HUBERT.
PORTABLE ELECTRIC LIGHT.
APPLICATION FILED JAN. 25, 1904.
NO MODEL. 2 SHEETS—SHEET 1.

Witnesses:
Raphaël Petter
Henry Barnes

Inventor
Conrad Hubert,
by Henry D. Williams Atty.

No. 762,720. PATENTED JUNE 14, 1904.
C. HUBERT.
PORTABLE ELECTRIC LIGHT.
APPLICATION FILED JAN. 25, 1904.
NO MODEL.
2 SHEETS—SHEET 2.
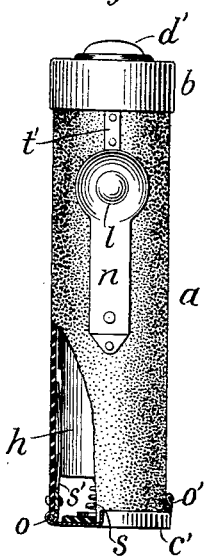
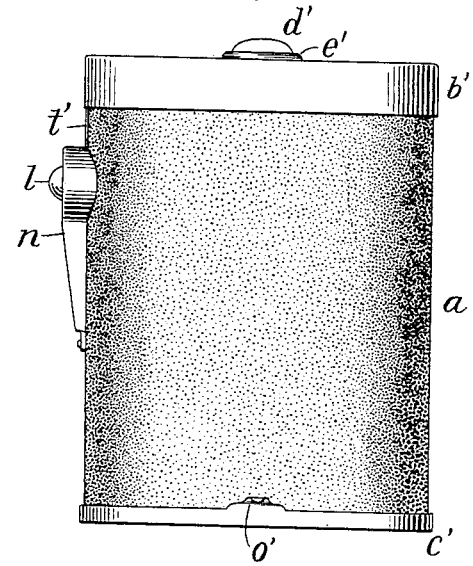
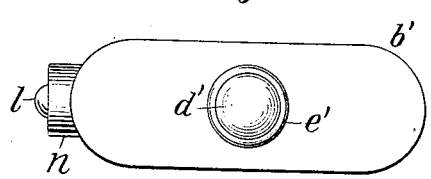
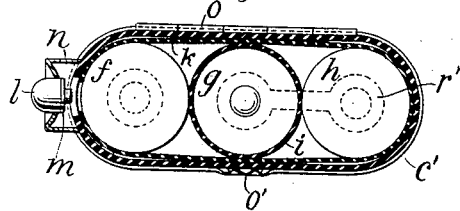
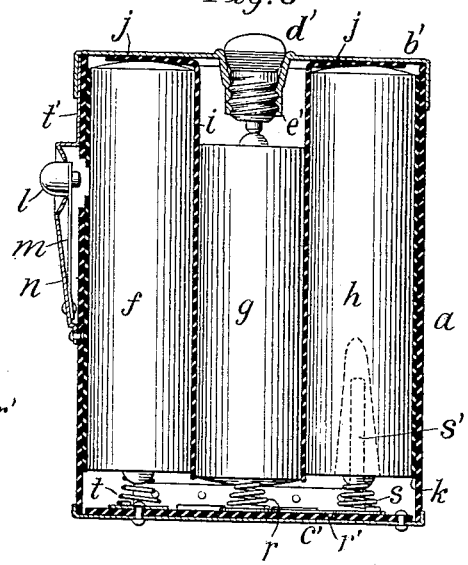
Witnesses:
Raphaël Netter
Henry Barnes
Inventor
Conrad Hubert
by Henry D. Williams Att'y
THE NORRIS PETERS CO., PHOTO-LITHO., WASHINGTON, D. C.

No. 762,720.

Patented June 14, 1904.

UNITED STATES PATENT OFFICE.

CONRAD HUBERT, OF NEW YORK, N. Y.

PORTABLE ELECTRIC LIGHT.

SPECIFICATION forming part of Letters Patent No. 762,720, dated June 14, 1904.

Application filed January 25, 1904. Serial No. 190,619. (No model.)

*To all whom it may concern:*

Be it known that I, CONRAD HUBERT, a citizen of the United States, residing in the borough of Manhattan, city of New York, county of New York, and State of New York, have invented certain new and useful Improvements in Portable Electric Lights, of which the following is a specification, reference being had therein to the accompanying drawings, forming a part thereof.

My invention relates to portable electric lights, and has for its object simplicity and compactness of construction and reliability and effectiveness of operation.

My invention includes the provision of an electric lamp sunk within the casing and of a battery comprising a plurality of cells arranged side by side in the casing, the electric lamp being in proximity to an end of one of the cells and this cell being of shorter length than the other cell or cells to accommodate the lamp and the other cell or cells being of the maximum length permissible or desirable in the casing, so that a maximum of battery-power is attainable with a casing of small dimensions and with the lamp sunk within the casing.

My invention also includes a resilient normally open circuit-closer at the side of the casing and contacting directly with a side wall of one of the battery-cells in close proximity to the wall of the casing, this circuit-closer having an externally-located projecting shield shielding the circuit-closer, so that it will not be accidentally closed.

My invention also includes a removable socket and holder for the electric lamp, such removable holder being interiorly arranged and removably connected to the inner part, and also includes improved means for insulating the battery-cells from each other and from the casing, and also includes various improvements in the construction and combination of parts.

I will now describe the portable electric lights illustrated in the accompanying drawings and embodying my invention and will thereafter point out my invention in claims.

Figure 1:
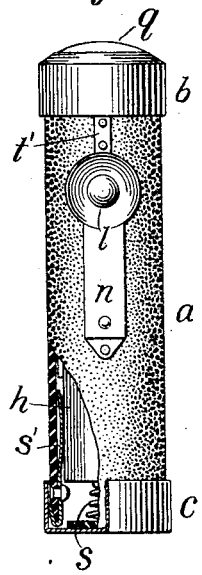
Figure 2:
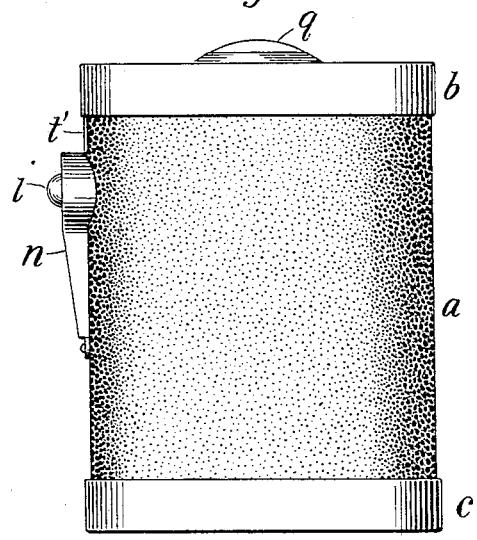
Figure 4:
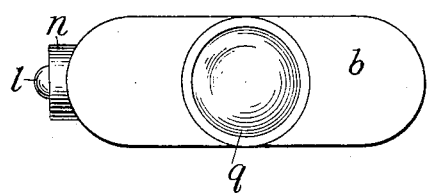
Figure 3:
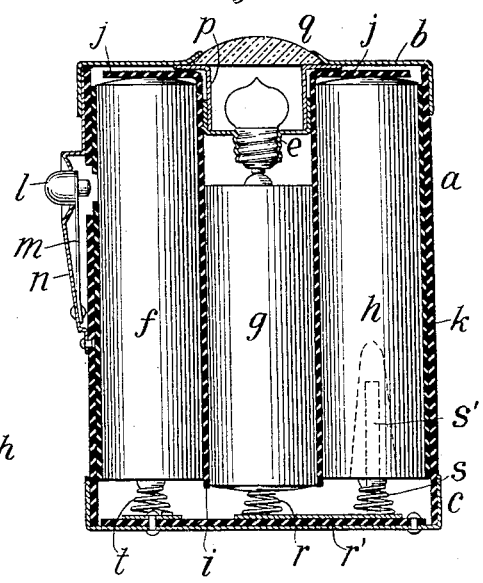
Figure 5:
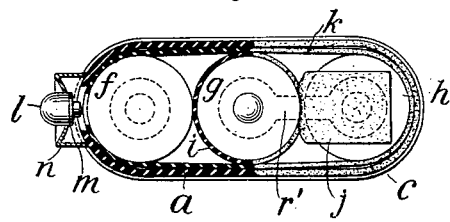

Figure 1 is a side elevation of a portable light, partly in section, looking toward the narrow side of the device. Fig. 2 is a side elevation of the same looking toward the wide side of the device. Fig. 3 is a central sectional elevation on a plane parallel to the front face in Fig. 2. Fig. 4 is a view looking toward the end of the device in which the electric lamp is sunk and socketed, such end being shown as the upper end in Figs. 1, 2, and 3. Fig. 5 is a horizontal sectional view of the same. Figs. 6 and 7 are side elevations looking toward the narrow and wide sides, respectively, of a device of modified construction. Fig. 8 is a vertical central section of the same. Fig. 9 is an end view of the same looking toward the end of the device in which the electric lamp is sunk and socketed within the casing. Fig. 10 is a horizontal sectional view of the same.

The casing is shaped to form a thin flat package without angular corners or protuberances, so as to be of convenient portable form, and especially so as to be well adapted to be carried in the pocket of the user. The body $a$ of the casing is made of insulating material, and the casing is flat at the wide sides and semicylindrical at the thin sides, so as to follow closely the contour of the inclosed battery-cells, and substantially flat at the ends, the insulating body having end covers, of metal or other conductive material.

In the construction shown in Figs. 1 to 5, inclusive, the end piece or cover $b$, which is the upper cover in the position illustrated, fits over the adjacent end of the casing $a$ and is slidably removable and has a detachable metallic socket $e$, in which the electric lamp is carried, this socket fitting over a downwardly-projecting tube $p$ of the cover. The corresponding cover $b'$ in the construction shown in Figs. 6 to 10, inclusive, is not designed to be removable, the electric lamp being carried in a socket $e'$, which is integral with the cover $b'$, and the lamp being insertible and removable externally. The other end piece or cover $c$ of the construction shown in Figs. 1 to 5, inclusive, slides tightly over the adjacent ends of the body and is not designed to be removable, while the corresponding cover $c'$ in the construction shown in Figs. 6 to 10, inclusive, is hinged at $o$ to the casing and is held in closed position by a spring-catch $o'$.

The lighting element is a miniature incandescent electric lamp and is socketed and sunk within the casing at the end thereof shown as the upper end. In the construction shown in Figs. 1 to 5, inclusive, the electric lamp $d$ is threaded into the detachable lamp-socket piece $e$. The lamp $d$ is sunk completely within the casing, and a lens $q$ is seated in a rim on the outer face of the cover $b$. A reflecting-surface is provided on the inner wall of the tube $p$ and the outer flat face of the socket-piece $e$.

The lens $q$ is fixedly set in the casing, access being had to the lamp for removal and replacement thereof by the removal of the upper cover $b$ from the body of the casing and the removal of the detachable socket $e$ from the upper cover. The reflecting-surface provided about the lamp and the directing action of the lens produce a powerful and effective light. In the modified construction shown in Figs. 6 to 10, inclusive, the lamp $d'$ is threaded into the socket $e'$ of the end piece $b'$, such socket being threaded at its inner portion and being of such depth that the lamp when screwed into the socket is sunk within the casing, so that its bulb projects but slightly from the casing, and the projecting part has the appearance of a lens and being a tipless lamp has no objectionable projection. The portion of the bulb which is sunk within the socket has a reflecting-coating, and thus the lamp itself performs the functions of reflecting and directing the light of the filament.

The battery is composed of a plurality of cells, which may be dry cells of any suitable construction and which are arranged side by side and fit within the casing, so as to completely fill all available space therein. Three of such cells $f$, $g$, and $h$ are shown, the middle cell, $g$, being of shorter length than the outer cells $f$ and $h$, to accommodate the lamp and lamp-socket. The contour of the body of the casing at the thin sides thereof is semicylindrical, following the contour of the outer battery-cells. The middle cell $g$ is insulated from the outer cells by a tube $i$, of insulating material, as paper, tightly fitted over the cell, and end flaps $j$ from this tube are bent outward over the upper ends of the outer cells and effectively insulate them from the upper end $b$ of the casing. A wrapping $k$, of insulating material, is also provided over all of the cells and holds them together in one package or unit for convenience of manufacture and sale of the battery and the removal of an exhausted battery and its replacement by new battery, as usual in this art. The battery-cells are similarly arranged and lettered in both constructions shown.

A circuit-closer is provided adapted for manual operation and located at one of the sides of the casing, so that it is in convenient position to be operated by the thumb or one of the fingers of the user. This circuit-closer is resilient and is normally in circuit-opening position. It comprises a push-button $l$ and a spring-finger $m$ and is located within a shield $n$, secured upon the body of the casing. The circuit-closer and shield are of electrically-conductive material, and the operation is effected by direct contact with one of the battery-cells, as $f$, the outer wall of which is, as usual, of zinc. The insulating-wrapping $k$ has an opening provided therein to permit of this direct contact. The push-button $l$ is the only exposed part of this circuit-closer and emerges from the shield at the inner part of a bowl-shaped depression, which so surrounds and shields the push-button as to obviate the liability of accidental closing of the circuit when the device is carried in the pocket of the user. This circuit-closer and shield are substantially alike in the two constructions shown.

The electric conductive means for the circuit of the batteries and lamp are partly provided by the casing and include the normally open circuit-closer above described. The carbon terminal of the middle or inner battery-cell $g$ abuts against the lower end of the central terminal of the lamp $d$. The zinc terminal or cup of this cell contacts directly with a spiral spring $r$, carried by the lower cover $c$, but insulated therefrom. A conductive strip $r'$ on the inner face of the cover $c$ conducts the circuit to a similar spring $s$, which contacts with the carbon terminal of the cell $h$, and the zinc cup of this cell contacts with a flat spring $s'$, held in the inner wall of the casing, the insulating-wrapping $k$ being cut away to permit this contact. The spring $s'$ is in metallic contact with the metallic cover $c$, and the current flows therethrough and through the spiral spring $t$, carried by the cover $c$ and in metallic contact therewith, to the carbon terminal of the cell $f$. From the zinc wall of the cell $f$ the path of the current is to and through the circuit-closer $m$ $l$ when closed, and from the metallic shield $n$ of this circuit by a metallic strip $t'$ the current enters the lamp-carrying metallic cover $b$ and flows through the metallic tube $p$ and metallic socket $e$ and enters the lamp through the usual metallic sleeve at the socket. Thus the cells of the batteries are connected in series with the lamp and no wires are required, the springs $t$, $r$, and $s$ making good contact with the battery-cells in the casing when the cover $b$ is in place and causing the battery $g$ to make good contact with the lamp. Moreover, all of these yielding contacts are self-cleaning.

In the modified construction (shown in Figs. 6 to 10, inclusive) the connections are as above described and are similarly lettered. The lower cover $c'$ is hinged, and the socket for the lamp is integral with the upper cover $b$; but the circuit-closing parts are otherwise substantially the same.

It is obvious that various modifications may be made in the construction shown and above particularly described within the spirit and scope of my invention.

What I claim, and desire to secure by Letters Patent, is—

1. A portable electric light comprising a battery-casing and a battery therein, the battery having a plurality of cells arranged side by side, an electric lamp socketed and sunk within the casing at one end thereof in proximity to an end of one of the cells, such cell being shorter than the other cell or cells, and electric conductive means for the circuit of the battery and lamp, such conductive means including a circuit-closer adapted for manual operation.

2. A portable electric light comprising a battery-casing and a battery therein, the battery having a plurality of cells arranged side by side, an electric lamp socketed and sunk within the casing at one end thereof in proximity to an end of a medial battery-cell, and contacting at one terminal with a terminal at such end of such cell, such medial cell being shorter than the other cells, the other terminal of the lamp being in electric conductive contact with its socket in the casing, and electric conductive means for completing the circuit of the battery and lamp, such conductive means including a circuit-closer adapted for manual operation.

3. A portable electric light comprising a battery-casing and a battery therein, an electric lamp carried by the casing, a resilient circuit-closer having a push-button thereon and located at the side of the casing, such circuit-closer being normally out of contact with the battery and arranged to come in contact with the wall thereof when the push-button is pressed inward, and the wall of the battery being in close proximity to the wall of the casing, and an externally-located projecting shield for the resilient circuit-closer having a bowl-shaped depression and a perforation at the bottom of such depression for the emergence of the push-button of the circuit-closer, and electric conductive means for completing the circuit of the battery and lamp from the resilient circuit-closer, such conductive means including the casing.

4. A portable electric light comprising a battery-casing and a battery therein, the battery having a plurality of cells arranged side by side, an electric lamp socketed and sunk within the casing at one end thereof in proximity to an end of a medial battery-cell and contacting at one terminal with a terminal at such end of such cell, such medial cell being shorter than the other cells, a tube of insulating material laterally inclosing such medial cell and having flaps protruding over the ends of the adjacent cells between such cells and the end of the casing at the lamp end thereof, and electric conductive means for completing the circuit of the battery and lamp and including a circuit-closer adapted for manual operation, substantially as set forth.

5. A portable electric light comprising a battery-casing and a battery therein, the battery having a plurality of cells arranged side by side, the casing having a removable cover with an inwardly-projecting part, a detachable lamp-socket within the casing and engaging such projecting part, an electric lamp in such socket and sunk within the casing and contacting at one terminal with a terminal of one of the battery-cells, and electric conductive means for completing the circuit of the battery and lamp, such conductive means including a circuit-closer adapted for manual operation.

6. A portable electric light comprising a battery-casing and a battery therein, the battery having a plurality of cells arranged side by side, one of the cells being shorter than the other cell or cells, the casing having a cover carrying an inner detachable conductive lamp-socket in proximity to such shorter cell, an electric lamp in such socket and sunk within the casing and contacting at one terminal with a terminal at the adjacent end of the shorter cell, and electric conductive means for completing the circuit of the battery and lamp, such conductive means including a circuit-closer adapted for manual operation, substantially as set forth.

7. A portable electric light comprising a battery-casing and a battery therein, the battery having a plurality of cells including an inner cell and two outer cells, arranged side by side, an electric lamp socketed and sunk within an electrically-conductive socket in the casing at one end thereof in proximity to an end of the inner cell and contacting at one terminal at such end of such cell, the casing including a cover at the other end thereof carrying separate resilient contact means for each cell arranged to contact with terminals at the adjacent ends of the cells, conductive means connecting two of such resilient contact means, a flexible contact device at the inner side wall of the casing arranged to contact with the cup of an outer cell, such flexible contact device being conductively connected through the cover to the resilient contact device for the outer cell, a resilient normally open circuit-closer adapted for manual operation and located at the side of the casing and arranged to contact with the cup of such last-mentioned outer cell, conductive means including the lamp-carrying end of the casing joining the circuit-closer to the conductive socket for the lamp and means for insulating the battery-cells from each other and from the casing except at the contacts above mentioned, substantially as set forth.

In testimony whereof I have affixed my signature in presence of two witnesses.

CONRAD HUBERT.

Witnesses:
HENRY D. WILLIAMS,
HENRY BARNES.